United States Patent [19]
Becker et al.

[11] 3,838,997
[45] Oct. 1, 1974

[54] METHOD AND APPARATUS FOR THE EVAPORATIVE COOLING TOOLS OF GLASS FORMING MACHINES

[75] Inventors: Kurt Becker, Obernkirchen; Lothar Schaar, Kobbensen, both of Germany

[73] Assignee: Hermann Heye, Obernkirchen, Germany

[22] Filed: Oct. 5, 1972

[21] Appl. No.: 295,366

[30] Foreign Application Priority Data
Oct. 8, 1971    Germany............................ 2150193

[52] U.S. Cl............................ 65/17, 62/64, 65/162, 65/355, 65/356, 164/128, 164/348, 165/1, 165/2, 199/56, 264/39
[51] Int. Cl............. C03b , C03b 9/38, F25b 13/00
[58] Field of Search .............. 65/355, 356, 162, 17; 165/1, 2, 117; 62/64; 51/356; 199/56; 164/128, 348; 264/39

[56] References Cited
UNITED STATES PATENTS

| | | | |
|---|---|---|---|
| 2,688,823 | 9/1954 | Weber | 65/223 X |
| 3,383,879 | 5/1968 | Tice | 62/64 X |
| 3,468,654 | 9/1969 | Torok | 65/355 |
| 3,644,110 | 2/1972 | Sendt | 65/356 X |

*Primary Examiner*—S. Leon Bashore
*Assistant Examiner*—Frank W. Miga
*Attorney, Agent, or Firm*—Michael S. Striker

[57] ABSTRACT

Method and apparatus for cooling tools, especially plungers and molds for glass forming machines, in which a cooling liquid is sprayed in atomized form through one or a plurality of nozzles against the tool surface to be cooled so that the liquid will evaporate upon contact with the surface to cool the latter. Spraying of liquid through the individual nozzles may be controlled either by the operator or automatically through sensing means sensing the temperature of the tool to be cooled.

7 Claims, 16 Drawing Figures

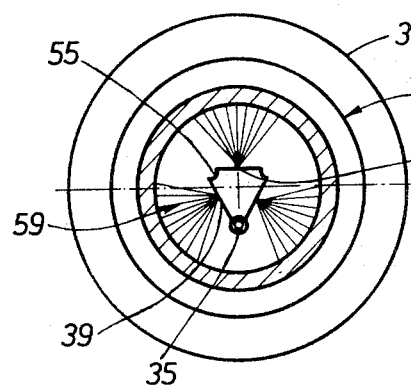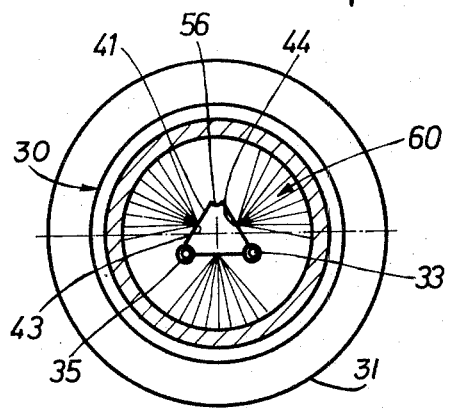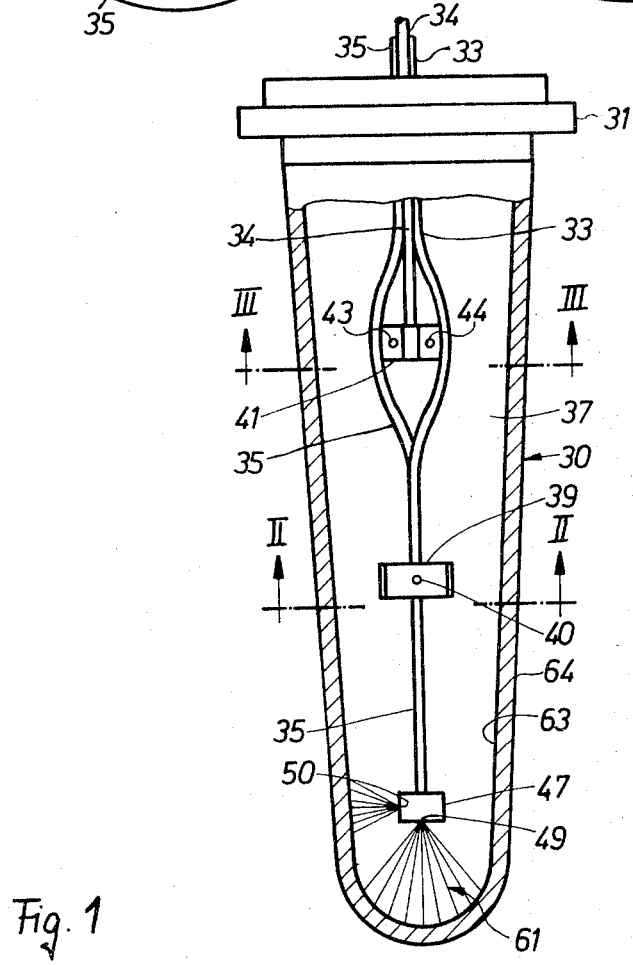

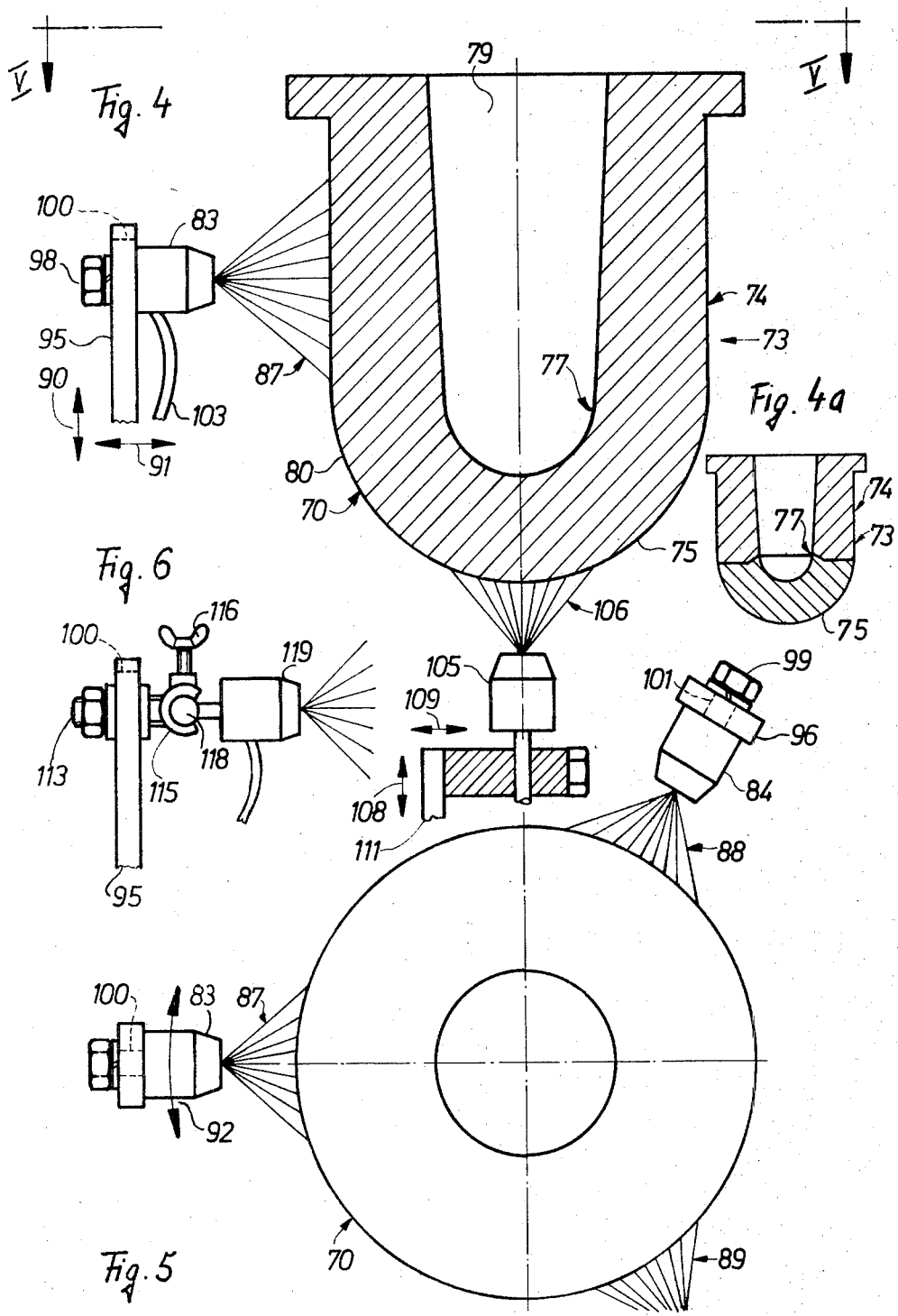

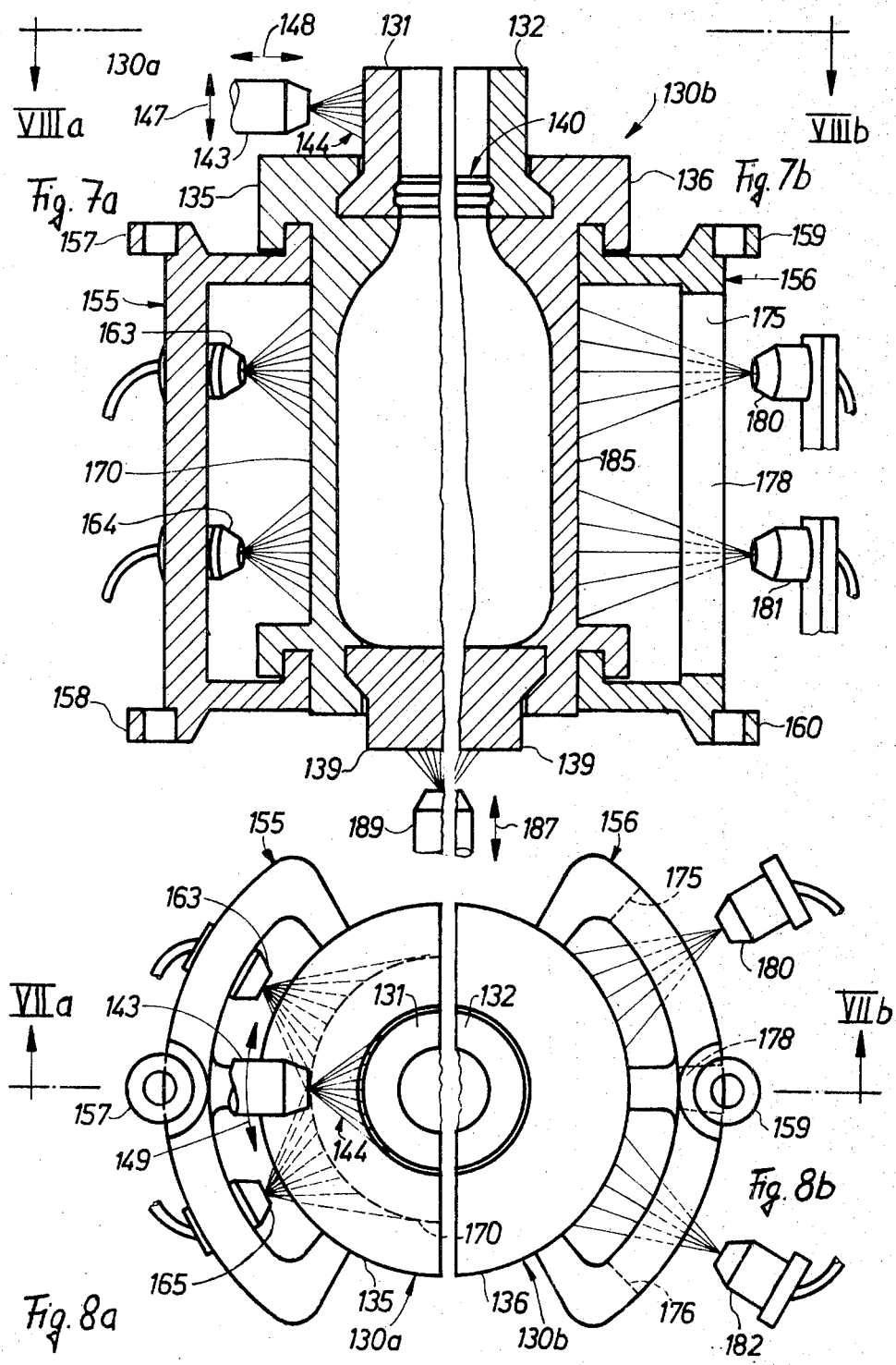

METHOD AND APPARATUS FOR THE EVAPORATIVE COOLING TOOLS OF GLASS FORMING MACHINES

BACKGROUND OF THE INVENTION

The present invention relates to a method and apparatus for the evaporative cooling of tools, especially plungers and molds for glass forming machines, by using the heat of evaporation of a cooling liquid which is brought in contact with the tool surface to be cooled to be evaporated upon contact of the surface.

A known method of this type is described in an article "Methods of Cooling of Forms of Glass Forming Machines" by Rudolf Wille. This article is published on pages 35-43 of a publication "Construction and Operation of Glass Forming Machines" by the Deutsche Glas-technische Gesellschaft, Frankfurt am Main, 1961. In this known method, a plurality of nipples into which cooling water is fed in form of drops, are screwed locally into the outer wall of a mold. This known way of cooling the mold has the following disadvantages. The heat sinks, i.e., the nipples are stationarily arranged with regard to the mold surface. The size of each of the nipples is evidently small and the molds provided with a plurality of such nipples is relatively expensive. Such molds have to have a relatively great wall thickness in order to permit a threading connection of the nipples and in order to obtain, in view of the small size of the heat sinks, by means of increased wall thickness, a sufficient temperature distribution over the complete mold surface. While it is possible to provide a relatively great number of nipples per surface unit, such an arrangement will evidently be rather expensive. This known mold has, due to the necessary great wall thickness and the nipples threadingly connected thereto including the necessary feed conduits for feeding cooling fluid to the nipples, relatively large dimensions, which is especially detrimental when for the mounting of the molds, especially in molds for small hollow glass bodies, only limited surface areas are available. An additional disadvantage of this known arrangement is that water will collect at the bottom of the nipples so that the evaporation of the liquid will occur beneath the liquid level and therefore under difficult conditions.

According to another known method (Austrian Pat. No. 24,927) an adjustable amount of cooling liquid is dripped or squirted into the hollow wall of a mold. The thus formed water vapor passes through the cavity formed in the mold wall to cool the latter. This method has the disadvantage that the water fed into the mold will impinge only onto a relative small area of the mold surface. This region will be undercooled as a heat sink, whereby due to the relatively great amount of water per surface unit a film evaporation will occur, while the heat transfer coefficient will considerably drop in an undesired manner. The temperature in this region is fixed due to the water accumulating thereon to a constant value of about 110°C. The other portions of the mold wall are cooled substantially only by heat convection through the wall and an additional cooling of the remaining mold wall portions by the water vapor is, due to the rather small available vapor volume, hardly obtainable. A substantially uniform temperature of the mold surface facing the glass is not obtainable with this known cooling mechanism. Neither is it possible to obtain sometimes desired temperature profiles on the surface to be cooled. In addition, the mold wall has to be hollow and relatively thick and requires therefore a relatively large space which, especially in modern compact automatic glass molding machines, is not available.

SUMMARY OF THE INVENTION

It is an object of the present invention to overcome the above-mentioned disadvantages of known methods and apparatus for cooling tools for glass forming machines.

More specifically, it is an object of the present invention to provide for a desired temperature distribution on the surface of the tool which comes in contact with the glass, to simplify the shape of the tool surface which faces away from the glass and to reduce the space requirement, the wall thickness, the weight and therewith the cost of the tool.

It is a further object of the present invention to automatically control the temperature of the tool surface for any desired operating conditions.

With these and other objects in view, which will become apparent as the description proceeds, the method according to the present invention of cooling tools, especially plungers and molds for glass forming machines, mainly comprises the step of spraying a cooling liquid in atomized form against the tool surface to be cooled so that the liquid will evaporate upon contact with the surface to cool the latter.

By spraying the cooling liquid in atomized form against the tool surface, a considerable increase of the surface of the cooling liquid is obtained before the latter impinges on the tool. The evaporation of the cooling liquid will in this case proceed very fast and undisturbed so that a quick and efficient cooling of the tool will be obtained. In addition, the sprayed jet will impinge on a relative large portion of the tool surface so that a uniform cooling may be obtained.

Film evaporation is practically avoided in this case. It is further possible to obtain on the surface of the tool which faces the glass a temperature profile, that is different temperatures at adjacent surface portions and to maintain such a temperature profile. It is possible to adjust the temperatures between a minimum of about 100°C and a maximum of about 400°C. In addition, heat dissipation by convection through the wall of the tool can be limited to a minimum. The tool can be made simpler, with small wall thickness, lighter and therefore at a smaller cost.

The cooling liquid may be heated close to its boiling point before spraying the liquid against the tool surface. In this case it is not necessary to bring the cooling liquid to its evaporation temperature by heating the same on the tool surface, but the cooling liquid will immediately evaporate upon impinging on the tool surface. In this way the cooling action will be expedited and improved.

The cooling liquid may be water and preferably pretreated water including a wetting agent, for instance a detergent, methanol or ethanol.

The apparatus according to the present invention for cooling tools of glass forming machines mainly comprises nozzle means arranged spaced from the surface of the tool to be cooled for spraying a cooling liquid in atomized form against the tool surface so that the liquid will evaporate upon contact with the surface to cool the latter. The nozzle means may comprise a single or a plurality of spaced nozzles. Thereby it is possible to arrange at least one of the nozzles stationarily in which case the tool itself is completely free of nozzles and the elements for supplying the nozzles with cooling fluid.

On the other hand, it is also possible to arrange at least one of the nozzles movable with the tool. In this way it is possible to spray the tool for a longer time during each operating cycle of the machine. The spray nozzle or nozzles may be mounted directly on the tool so that additional mounting means are avoided. On the other hand, the spray nozzle or nozzles may also be connected to the tool mounting means if this is necessary for constructive reasons.

According to a further development, the apparatus may also include sensing means for sensing the temperature of the tool to be cooled and control means cooperating with the sensing means and the nozzle means for controlling spraying of the cooling liquid against the surface in dependency on the sensed temperature. Such control means may control the duration at which cooling liquid is sprayed against the surface or the pressure at which the cooling liquid is sprayed.

According to a further embodiment of the present invention in which the tool is movable between a plurality of positions, sensing means are provided for sensing one of the positions of the tool and to control spraying of the cooling liquid against the tool surface in dependency on the position of the tool. The start of the spraying and the spray interval, respectively spraying intervals, may in this way be provided at the most favorable positions during the operating cycle of the tool.

According to a further modification for use with split molds, especially for a blank mold with a separate bottom part it is possible to spray the surface of the blank mold and/or the bottom part thereof with one or a plurality of spray nozzles in such a manner so that a symmetrical distribution of the glass at the bottom of the finished hollow glass article will result. Due to the parting line between blank mold and bottom part thereof there will result a so-called bottom mark or small fin at the bottom of the parison which during the further operating cycle of the glass forming machine often changes its position relative to the longitudinal axis of the hollow glass article. The machine operator may observe the position of this bottom mark as the parison leaves the blank mold and if necessary cool the blank mold and/or the bottom part thereof at different portions to a different degree so that the symmetry of the glass distribution at the bottom of the finished hollow glass article will be maintained. For this purpose, the apparatus of the present invention may include a source of cooling liquid under pressure, a plurality of conduits respectively connecting a plurality of nozzles with the source, while manually operatable control means in form of valves are provided in each of the conduits so that the operator may control the spraying of different portions of the blank mold to a different degree.

According to a further development of the present invention at least one of the spray nozzles is adjustable along one or a plurality of coordinates relative to the tool. In this way it is possible to direct the spray nozzle quickly and exactly onto that portion of the tool which is to be sprayed. At least one of the spray nozzles may also be angularly adjustable with respect to the tool. This is especially advantageous if the jet emanating from the nozzle has to spray portions of the tool which cannot be reached when the jet extends vertically with respect to the tool surface.

The cooling liquid may be sprayed against the tool surface in the form of a full cone or in the form of a hollow cone.

According to a further modification, the tool surface to be sprayed may be profiled to obtain a capillary structure so that the cooling fluid sprayed on the profiled surface is distributed by capillary forces. The capillary structure may for instance be formed by small grooves and ridges machined into the tool surface.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 1 is a partial longitudinal section through a plunger provided, according to the present invention, with three spray nozzle bodies;

FIG. 2 is a cross section taken along the line II—II of FIG. 1;

FIG. 3 is a cross section taken along the line III—III of FIG. 1;

FIG. 4 is a longitudinal cross section through a mold with a plurality of spraying nozzles mounted outside the mold;

FIG. 4a is a longitudinal cross section through a split mold similar to that shown in FIG. 4 drawn to a smaller scale to be provided with spray nozzles as shown in FIG. 4;

FIG. 5 is a top view of the arrangement shown in FIG. 4 viewed in the direction of the arrows V—V;

FIG. 6 is a side view of a universally adjustable spray nozzle;

FIG. 7a is a partial longitudinal section through a blow mold including mounting means thereof with some of the spray nozzles mounted on the mounting means;

FIG. 7b is a partial longitudinal section similar to FIG. 7a in which the spray nozzles are mounted outside the mounting means of the mold;

FIG. 8a is a top view of the arrangement shown in FIG. 7a as viewed in direction of the arrows VIIIa;

FIG. 8b is a top view of the arrangement shown in FIG. 7b as viewed in the direction of the arrow VIIIb;

Figure 9:
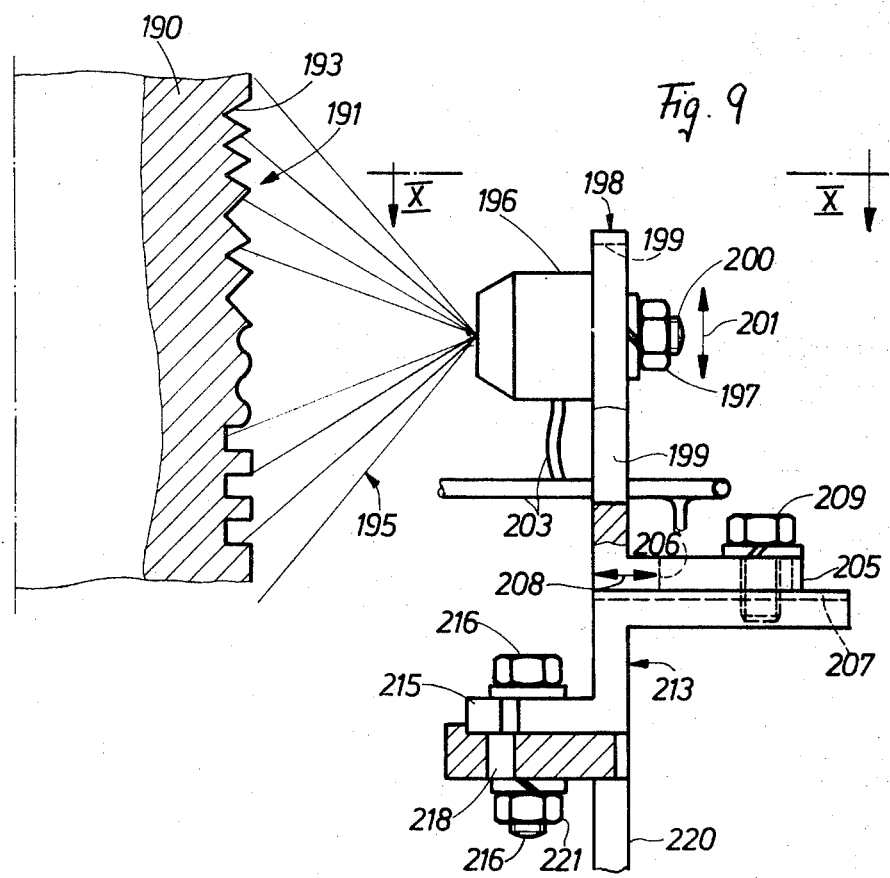
FIG. 9 is a cross section taken substantially along the line IX—IX of FIG. 10 and illustrating an adjustable spray nozzle and part of a tool having a profiled capillary outer surface.

DESCRIPTION OF THE PREFERRED EMBODIMENTS:

FIG. 1 illustrates a plunger 30 which serves to preform a gob in a preform or a blank mold. The plunger 30 is provided with a coupling ring 31 to couple the latter with a drive which moves the plunger in vertical direction. Three conduits 33, 34 and 35 for a cooling fluid extend centrally through the coupling ring 31 and are fastened to the latter. The conduit 33 leads through the hollow interior 37 of the plunger 30 to an intermediate spray nozzle body 39 provided with three spray nozzles of which only the spray nozzle 40 is schematically indicated in FIG. 1.

The conduit 34 leads to the upper spray nozzle body 41 which is also provided with three spray nozzles of which the nozzles 43 and 44 are indicated in FIG. 1.

Finally, the conduit 35 leads to a lower spray nozzle body 47 which is provided with a downwardly spraying nozzle 49 and three laterally spraying nozzles of which only the spray nozzle 50 is indicated.

The spray nozzles bodies 39, 41 and 47 are to be supplied simultaneously or individually or in any combination with cooling fluid and in addition it is also possible to adjust the pressure of the cooling fluid in the conduits 33, 35 and 37 in a different manner to influence thereby the cooling action obtained by the spray nozzle bodies respectively connected thereto.

The cooling fluid will evaporate on the inner surface of the plunger 30. The steam produced thereby will escape in upward direction through openings in the coupling ring 31. The spray nozzle bodies 39 and 41 have, as shown in FIGS. 2 and 3, a triangular cross section, while the corners of the bodies are formed with cutouts, as for instance shown at 55 and 56, which serve for locating the conduits 33–35.

The cooling fluid passes from the spray nozzles in form of a spray cone, as for instance indicated at 59, 60 and 61, onto the inner surface 63 of the plunger 30, the outer surface 64 will be contacted at least in part by glass. Even though the spray cones are shown in full lines, this does not mean that the nozzles will spray the cooling fluid in continuous streams. The cooling fluid is actually atomized as it leaves the spray nozzle so that the cooling fluid impinges in form of very fine drops onto the inner surface 63.

FIG. 4 illustrates a one-piece preform or blank mold 70 adapted to receive in its interior 79 a gob of molten glass fed thereinto in a known manner from a supply of molten glass. Subsequently thereto a plunger, for instance a plunger as shown at 30 in FIGS. 1 – 3, is inserted into the interior 79 of the blank mold to form a so-called parison from the gob. The gob of molten glass transmits periodically heat to the blank mold which is transmitted through the wall of the same to the outer surface 80 thereof.

Three spray nozzles are arranged about the circumference of the blank mold, of which only two, that is the nozzles 83 and 84 are shown in FIGS. 4 and 5, and the spray nozzles spray cooling fluid in form of spray cones 87, 88 and 89 onto the exterior surface 80 of the blank mold. Each of the spray nozzles is adjustable in vertical and horizontal direction as well in circumferential direction with respect to the blank mold as indicated by the double arrows 90, 91 and 92. In this way it is possible to place each of the spray nozzles quickly and simply into a desired position relative to the blank mold. For adjusting each of these spray nozzles in vertical direction a vertically extending mounting member 95 is provided with a vertically extending elongated slot, as for instance indicated at 100 and 101, through which screws, as indicated at 98 and 99 extend which fasten the respective nozzle to the mounting member. The mounting members themselves are adjustable in horizontal direction toward and away from the axis of the mold and in circumferential direction relative to the axis in a well known manner not shown in the drawing.

The mounting members for instance shown at 95 and 96 may be adjustably mounted on the frame of the glass forming machine or be connected to the mold 70. The spray nozzles are supplied through conduits 103 with a cooling fluid from a source of such cooling fluid not shown in the drawing.

The bottom portion of the blank mold 70 is colled by the spray cone 106 emanating from the spray nozzle 105. The spray nozzle 105 is vertically and horizontally adjustable as indicated by the double arrows 108 and 109 and if necessary also in a third direction normal to the plane of the drawing by means of its mounting member 111.

FIG. 4a illustrates a modified blank mold 73 in a smaller scale. The blank mold 73 has an upper part 74 and a bottom part 75 meeting the upper part along a split line 77. The various spray nozzles for cooling the blank mold 73 illustrated in FIG. 4a are not shown in this Figure, but it is understood that a plurality of spray nozzles as indicated in FIGS. 4 and 5 are also arranged about the circumference of the upper part 74 of the split bank mold whereas a spray nozzle as shown at 105 in FIG. 4 serves to cool the bottom part 75 of this blank mold.

FIG. 6 illustrates a modified mounting of a spray nozzle 119. The mounting member 95 is again provided with an elongated vertically extending slot, as indicated at 100, through which a threaded pin 113 extends which can be fixed by means of the nut provided thereon in any desired vertical position in the slot. The pin 113 carries at its inner end a ball joint comprising a spherical socket 115 in which a ball 118 is located which may be adjusted relative to the socket and fixed in any adjusted position by the set screw 116. The spray nozzle 119 is fixedly connected to the ball 118 so that the position of the nozzle may be adjusted in a universal manner.

FIG. 7a and FIG. 8a respectively shown the vertical cross section and a top view of the left-half of a blow mold and a plurality of spray nozzles for cooling the outside of the mold. It is understood that the blow mold 130a comprises also a complementary right half, not shown in the drawing. FIG. 7a shows left neck ring half 131 of the blow mold 130a, the main blow mold half 135 and half of the blow mold bottom 139. A bottle 140 to be formed in the blow mold is shown in the interior thereof.

The neck ring half 131 is cooled by a spray cone 144 emanating from a spray nozzle 143 which is adjustable, as indicated by the double arrows 147 and 148, in vertical as well as in horizontal direction relative to the axis of the blow mold and preferably also in circumferential direction with respect thereto. The spray nozzle 143 may be adjustably mounted on the machine frame not shown in the drawing or connected in any desired manner to the blow mold itself.

Each of the blow mold halves, of which only the left one 135 is shown in FIG. 7a is mounted in a carrier or mounting member 155 which, over coupling members 157 and 158, is connectable to tongs, not shown in the drawing, for movement relative to each other.

Four spray nozzles, of which only the spray nozzles 163–165 are illustrated in the drawing, are mounted on the mounting member 155 for spraying cooling fluid against the outer surface 170 of the blow mold half illustrated in the drawing, and it is understood that corresponding nozzles are also arranged of the other half of the blow mold, not shown in FIG. 7a.

FIGS. 7b and 8b respectively show a slightly modified arrangement in vertical section and in a top view. In these two Figures only the right half of a blow mold is illustrated and it is understood that the blow mold comprises also a corresponding symmetrical left half not shown in the drawing. The blow mold 130b shown in FIGS. 7b and 8b again comprises two neck ring halves 132, only the right one is illustrated in the drawing, two main blow mold halves 136 of which also only the right half is shown and a blow mold bottom 139. The half of the blow mold mounting member 156 shown in the drawing is provided with two windows 175 and 176 which are separated by a central web 178 from each other. Coupling members 159 and 160 are provided for this mounting member for connecting each of the blow mold halves of the blow mold 130b to tongs, not shown in the drawing for movement relative to each other. Four spray nozzles, of which only the spray nozzles 180–182 are shown in FIGS. 7b and 8b, are provided for each half of the blow mold 130b for spraying cooling fluid against the outer surface of the respective blow mold half. The aforementioned spray nozzles are mounted universally adjustable on the machine frame, not shown in the drawing, outside of the path of movement of the mounting member halfs 156.

The bottom 139 of the blow mold is in both cases cooled by the spray cone emanating from the nozzle 189 which is adjustable in axial direction of the blow mold as indicated by the double arrow 187. This last-mentioned nozzle may be mounted on the machine frame or be connected in any desired manner, not shown on the drawing, to the blow mold for movement therewith.

FIG. 9 illustrates a mold part 190 which on its outer surface is provided with circumferential grooves 193 of triangular, semicircular and square cross section to obtain a capillary structure 191. The cooling fluid is sprayed in the form of a hollow cone 195 from a spray nozzle 196 onto the capillary structure 191 on which it is distributed by means of capillary forces beyond the actual impinging area of the hollow cone 195.

The spray nozzle 196 is by means of a nut 197 fastened to a mounting member 198, which is provided with a vertically elongated slot 199, through which the screw 200 for fastening the nozzle extends so that the spray nozzle 196 is adjustable in vertical direction as indicated by the double arrow 201. A conduit 203 connects the spray nozzle 196 to a source of cooling fluid under pressure, not shown in the drawing.

The foot 205 of the mounting member 198 is provided with an elongated slot 206 and the foot is movable on the machine bed 207 in the direction of the double arrow 208 and fixable in any adjusted position by a screw 209 extedning through the slot 206.

The bed 207 forms part of an intermediate holder 213 which is provided with a curved foot 215 through which a screw 216 extends. The screw 216 extends likewise through a curved slot 218 in a bottom mounting member 220 where it is fastened by means of a nut 221. In this way it is possible to adjust the spray nozzle 196 in the direction of the double arrow 223 as shown in FIG. 10 in circumferential direction about the mold part to bring the spray nozzle in the desired angular position relative thereto.

Figure 10:
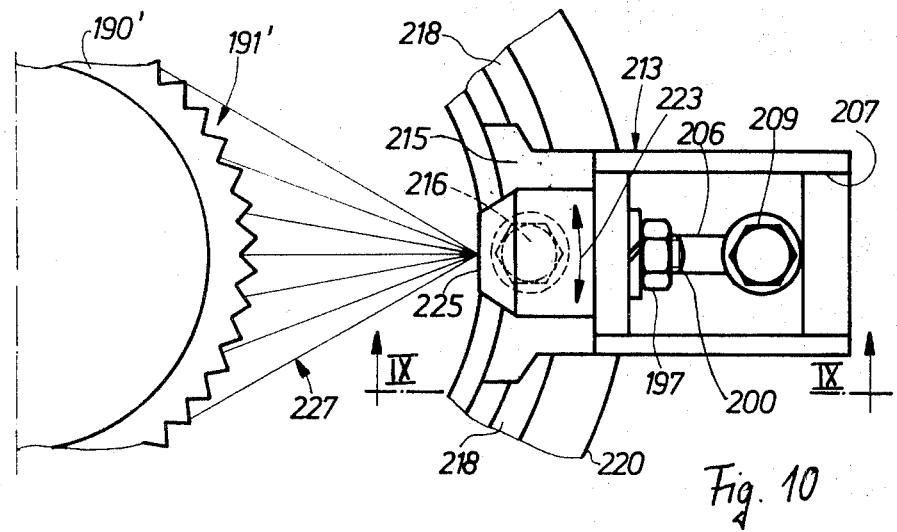
FIG. 10 is a top view of the nozzle of the arrangement shown in FIG. 9 as viewed in the direction of the arrows X—X of FIG. 9 with a slightly modified tool.

FIG. 10 shows a slightly modified arrangement in which the mold part 190' is provided with a capillary structure 191' which comprises vertically or axially extending grooves of triangular cross section. The spray nozzle 225 sprays the cooling fluid in form of a full cone 227 against the capillary surface 191'. Otherwise, the adjustability of the spray nozzle is the same as described above in connection with FIG. 9.

Figure 11:
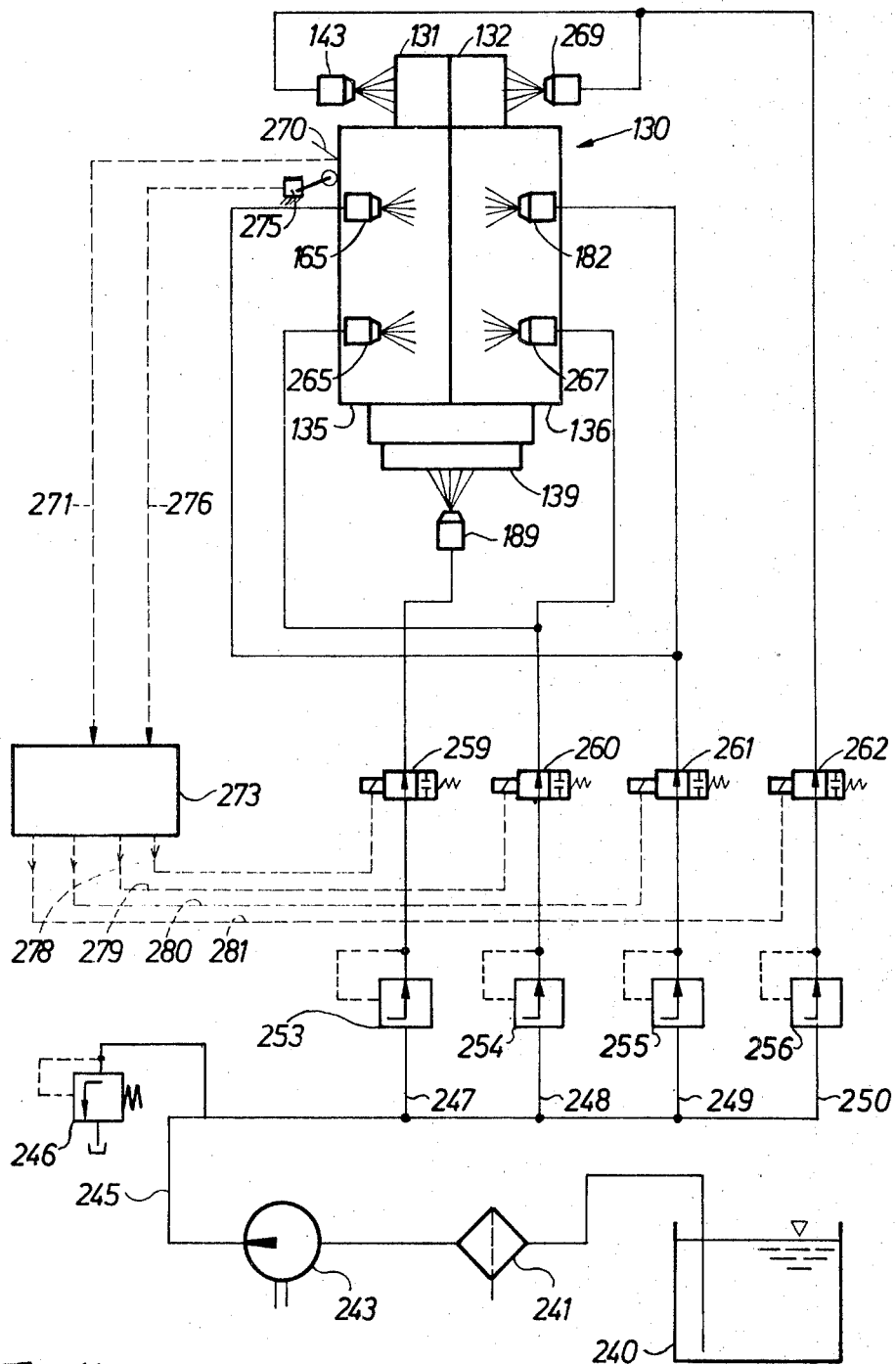
FIG. 11 is a diagram illustrating an arrangement for supplying the spray nozzles of a blow mold, as for instance shown in FIGS. 7a and 8a, with cooling fluid.

FIG. 11 diagrammatically illustrates an arrangement in which cooling of a blow mold as for instance illustrated in FIGS. 7a and 7b by means of spray nozzles is automatically controlled in dependency on the position of the mold and on the temperature of the latter.

As shown in FIG. 11 the arrangement comprises a tank 240 for the cooling liquid which is drawn from the tank through a filter 241 by a pump 243 into a conduit 245 from which the cooling fluid under pressure passes into four branch conduits 247–250, in each of which pressure regulating valves 253–256 are respectively located. Each of the branch conduits 247–250 is further provided with a two-way, two-position valve 259–262 arranged downstream of the respective pressure regulating valve.

The branch conduit 247 provides the spray nozzle 189 for the bottom part 139 of the blow mold 130. The branch conduit 248 leads to four lower spray nozzles for the two halves 135 and 136 of the blow mold, of which only the two nozzles 265 and 267 are shown in the drawing. The branch conduit 249 is connected to the four upper spray nozzles, of which only the nozzles 165 and 182 for the blow mold halves 135 and 136 are shown. The branch conduit 250 is connected to the spray nozzles 143 and 269 for the neck ring half 131 and 132.

The arrangement comprises further a temperature sensing means 270 of known construction which is in contact with the mold 130. In addition the arrangement comprises also a position sensing means or switch 275 which is actuated when the mold reaches during its operating cycle a predetermined position. The temperature sensing means 270 is connected by a conductor 271 and the position sensing means 275 through a conductor 276 to a control device 273 of known construction and only schematically shown in FIG. 11. Conductors 278–281 lead from the control device 273 respectively to the electromagnets of the electromagnetically actuatable valves 259–262.

When the mold 130 reaches during its operating cycle a predetermined position, the position sensing means 275 is acutated and transmits a signal to the control device 273. Upon receipt of this signal the control device 273 actuates over the conductors 278–281 the electromagnets of the valves 259–262 to bring these valves into the open position, as shown in the drawing, so that cooling fluid under pressure may pass through all of the spray nozzles and so that the cooling fluid will be sprayed onto the outer surface of the mold 130 to cool the latter. During this cooling of the mold the temperature of the latter will be sensed by the temperature sensing means 270 and the latter will transmit a signal to the control device 273 when the temperature of the mold 130 drops beyond a predetermined temperature which causes the control device 273 to bring the valves 259–262 into the closed position to terminate thereby further cooling of the mold.

While FIG. 11 shows only a single temperature sensing means 270, it is understood that a plurality of such temperature sensing means may be provided contacting different portions of the mold 130 so that the spray nozzles may be individually controlled. The conduit 245 leading from the pump 243 to the branch conduits 247–250 is further protected against overpressure by overpressure valve 246 connected thereto.

Figure 12:
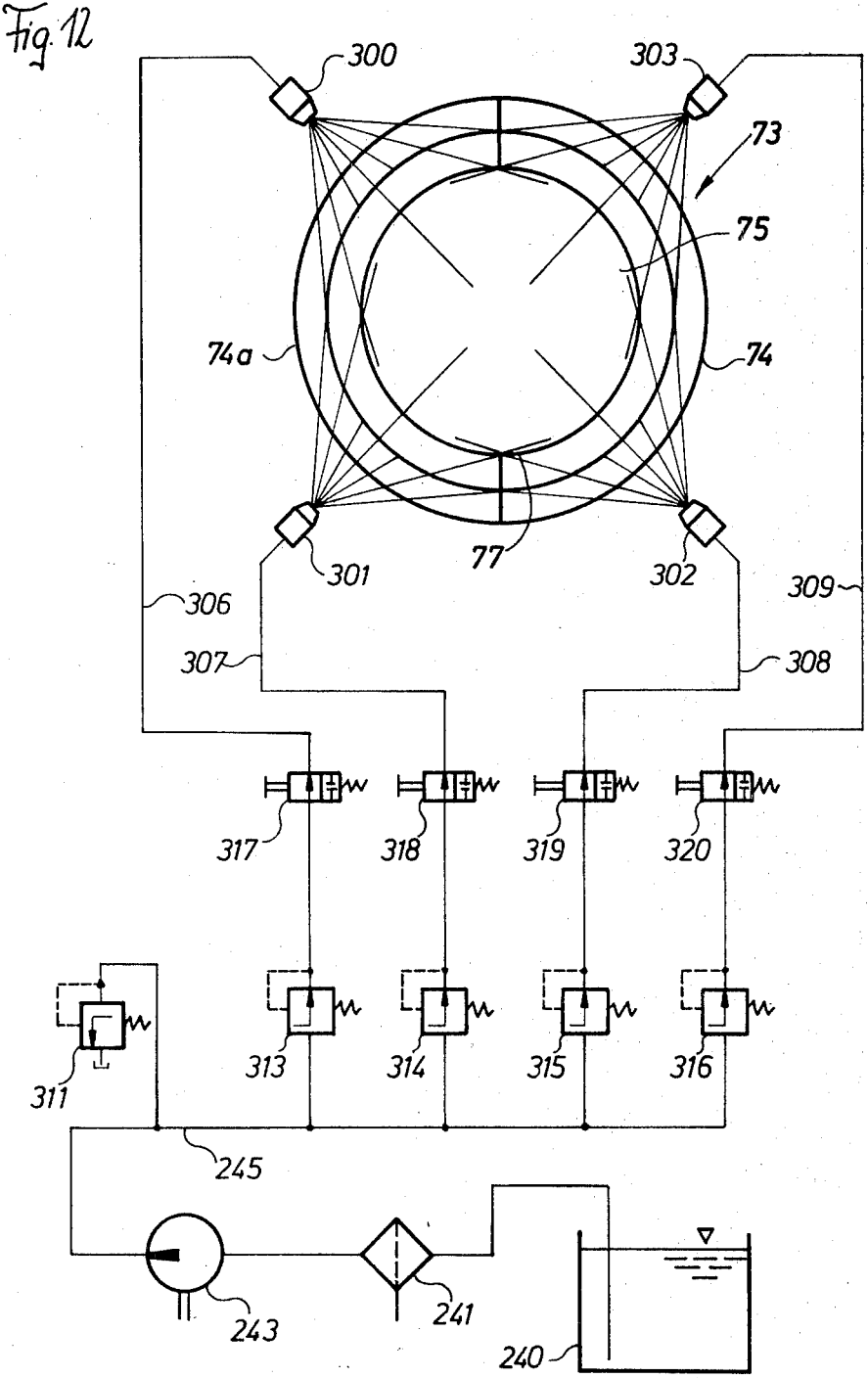
FIG. 12 is a diagram illustrating an arrangement for supplying the spray nozzles of a blank mold with cooling fluid with manual control of the cooling fluid sprayed by each of the nozzles.

FIG. 12 schematically illustrates the arrangement shown in FIG. 4a, especially serving to obtain a symmetrical distribution of the glass at the bottom of the finished hollow glass article. FIG. 12 illustrates in its upper part a bottom view of a blank mold, as shown for instance in FIG. 4a, which blank mold comprises the two blank mold halves 74 and 74a and the blank mold bottom. In the arrangement illustrated in FIG. 12 the blank mold bottom is cooled by spray cones emanating from four spray nozzles 300–303 arranged circumferentially spaced from each other for spraying cooling liquid against different portions of the bottom part of a blank mold.

The spray nozzles 300–303 are supplied by conduits 306–309 with cooling liquid under pressure fed to the branch conduits 306–309 through the conduit 245 to which the cooling liquid under pressure is supplied from the tank 240 over the filter 241 by the pump 243. Each of the branch conduits 306–309 is provided with a pressure regulating valve 313–316, respectively and a two-way two position valve 317–320. The valves 317–320 are respectively manually adjustable between an open and a closed position. The conduit 245 is again protected against an overpressure by an overpressure valve 311 connected thereto.

As mentioned before, the arrangement shown in FIG. 12 is especially designed to obtain a symmetrical glass distribution at the bottom of a finished hollow glass article. For this purpose, the operator of the glass forming machine will observe the position of the so-called bottom mark on the parison. This bottom mark results from the parting line between the blank mold and the blank mold bottom. If the operator of the machine observes that this bottom mark is not symmetrically with respect to the axis of the parison as the latter is carried by the neck rings from the blank mold to the blow mold, then the operator will cool the bottom 75 of the blank mold 73 in an asymmetrical manner so that the bottom mark on the finished hollow glass article will again assume a position symmetrical to the axis of the finished article. This will assure a symmetrical glass distribution at the bottom of the finished hollow glass article. The assymmetrical cooling of the bottom 75 of the blank mold is obtained by selectively operating one or a plurality of the valves 317–320.

Figure 13:
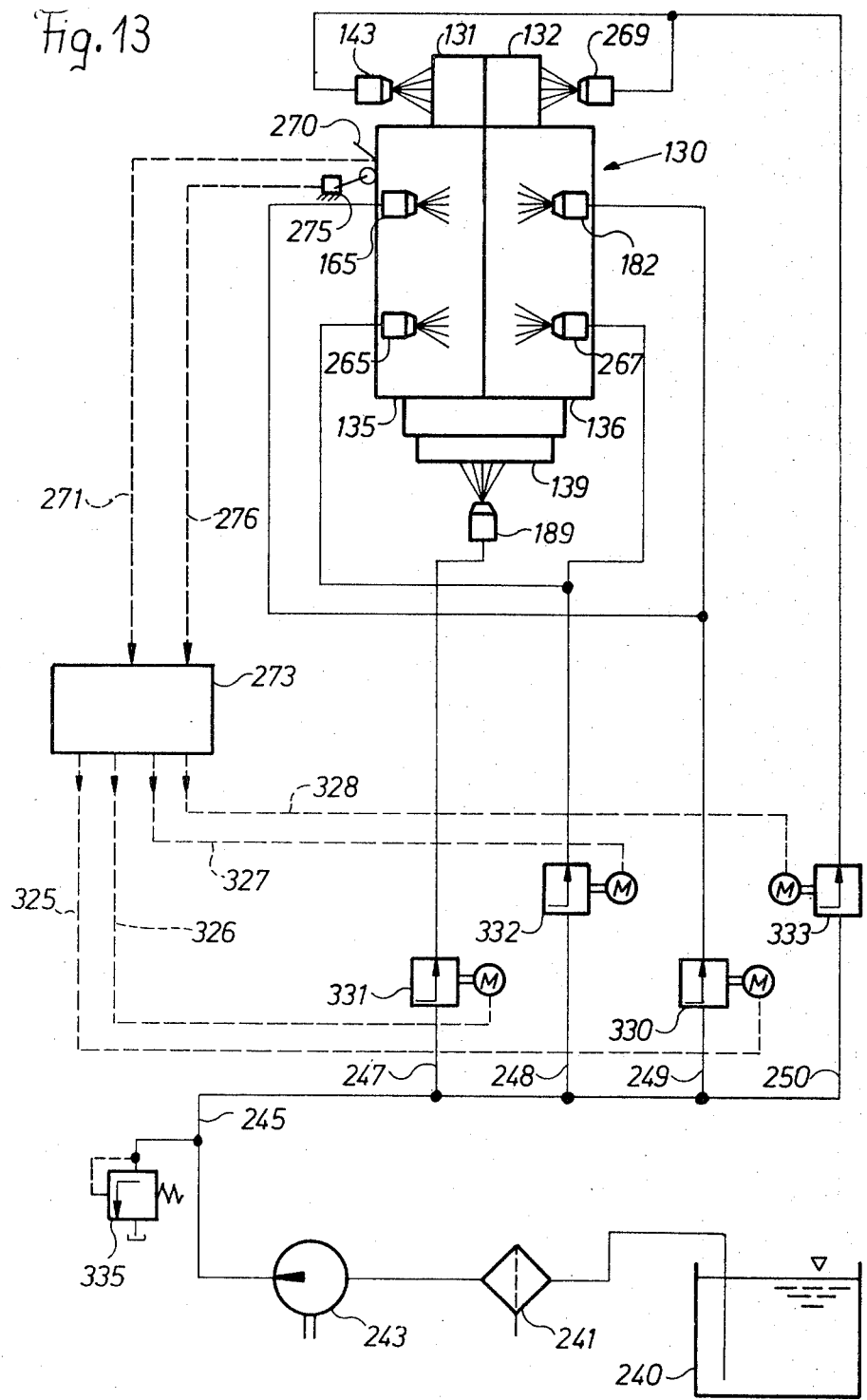
FIG. 13 is a diagram similar to that of FIG. 11 and illustrating an arrangement for controlling the pressure at which the cooling fluid is sprayed through the various nozzles.

FIG. 13 illustrates a modified arrangement for cooling a blow mold 130, similar to the arrangement shown in FIG. 11 and identical elements are in FIG. 13 designated with the same reference numeral as in FIG. 11. The principal difference between the arrangement shown in FIGS. 11 and 13 is that in the arrangement of FIG. 11 the degree of cooling of the blow mold is controlled by controlling the duration of spraying of cooling fluid against the mold, whereas in the arrangement of FIG. 13 the pressure of the cooling fluid transmitted to the various spray nozzles and therewith the amount of cooling fluid transmitted through the spray nozzles onto the mold is controlled. The pressure of the cooling fluid sprayed against the outer surface of the mold is controlled in the arrangement shown in FIG. 13 automatically in dependence on the tenperature sensed by the temperature sensing means 270 and eventually also in dependence on the position of the mold 130 sensed by the position sensing means 275. For this purpose the control device 273 is connected by four conductors 325–328 to the position motors M of pressure regulating valves 330–333 respectively provided in the branch conduits 247–250 which respectively lead from the supply conduit 245 to the various nozzles as shown in FIG. 13. The position adjusting motors M permit a stepless adjustment of the pressure regulating valves and therewith a stepless adjustment of the pressure of the cooling fluid in the branch conduits 247–250 downstream of the valves.

The maximum pressure desired at the spray nozzles is maintained in the conduit 245, which is protected against overpressure by the valve 335, by the pump 243. This maximum pressure is selectively regulated by the pressure regulating valves 330–333 to the pressure desired at the spray nozzles respectively connected to the branch conduits 247–250 in dependency on the temperature of the mold sensed by the temperature sensing means 270. When it is desired to terminate the spraying, then the pressure regulating valves 330–333 are adjusted by the control device 273 to a pressure value equal zero, that is the control motor will close the valves. Start and stopping of spraying will be controlled by the position sensing means 275 which has to be constructed to stop spraying during opening of the mold halves 135 and 136 to prevent thereby that cooling liquid impinges onto the finished glass article formed in the blow mold.

It will be understood that each of the elements described above, or two or more together, may also find a useful application in other types of the methods and apparatus for cooling tools differing from the types described above.

While the invention has been illustrated and described as embodied in the methods and apparatus for cooling tools especially plungers and molds for glass forming machines by spraying cooling liquid in atomized from against the tool to be cooled, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and therefore such adaptations should and are intended to be comprehended within the meaning and range of equivalence of the following claims.

What is claimed as new and desired to be protected by Letters Patent is:

1. A method of cooling tools, especially plungers and molds for glass forming machines, by using the heat of evaporation of a cooling liquid, comprising the steps of providing a cooling liquid under pressure; spraying only the cooling liquid under pressure without a carrier gas through a plurality of nozzles in atomized form against different portions of the surface of the tool to be cooled so that the liquid will evaporate upon contact of said surface to cool the latter; and controlling the liquid passing through some of said plurality of nozzles in a manner different from the manner the liquid passes through other of the plurality of nozzles to obtain a desired cooling profile on said surface.

2. A method as defined in claim 1, wherein said controlling step comprises the step of regulating the amount of cooling liquid which passes per time unit through some of said nozzles in such a manner to be different and independent from the amount of cooling liquid which passes per time unit through the other of said nozzles.

3. A method as defined in claim 1, wherein said controlling step comprises the step of controlling the time during which cooling liquid is passed through some of said nozzles in such a manner to be different and independent from the time cooling liquid passes through the other of said nozzles.

4. A method as defined in claim 1, and including the step of heating the cooling liquid close to its boiling point prior to spraying the liquid against the tool surface.

5. A method as defined in claim 1, wherein the cooling liquid is water.

6. A method as defined in claim 1, wherein the cooling liquid is pretreated water including a wetting agent.

7. A method as defined in claim 1, wherein the cooling liquid is demineralized pure water including a detergent, methanol or ethanol.

* * * * *